United States Patent
Song et al.

(10) Patent No.: US 9,374,776 B2
(45) Date of Patent: Jun. 21, 2016

(54) CELL SEARCH CONTROL METHOD, CELL SEARCH CONTROL APPARATUS, MOBILE COMMUNICATION TERMINAL, COMPUTER PROGRAM AND STORAGE MEDIUM

(75) Inventors: Hongping Song, Beijing (CN); Guiming Chang, Beijing (CN)

(73) Assignee: ST-ERICSSON SA, Plan-les-Ouates (CH)

( * ) Notice: Subject to any disclaimer, the term of this patent is extended or adjusted under 35 U.S.C. 154(b) by 0 days.

(21) Appl. No.: 14/387,263

(22) PCT Filed: Apr. 27, 2012

(86) PCT No.: PCT/CN2012/074819
§ 371 (c)(1),
(2), (4) Date: Jan. 7, 2015

(87) PCT Pub. No.: WO2013/159334
PCT Pub. Date: Oct. 31, 2013

(65) Prior Publication Data
US 2015/0156713 A1  Jun. 4, 2015

(51) Int. Cl.
*H04W 48/20* (2009.01)
*H04W 48/16* (2009.01)
*H04W 52/02* (2009.01)
*H04W 36/00* (2009.01)
*H04W 88/06* (2009.01)

(52) U.S. Cl.
CPC .............. *H04W 48/20* (2013.01); *H04W 48/16* (2013.01); *H04W 52/0209* (2013.01); *H04W 36/0061* (2013.01); *H04W 52/0212* (2013.01); *H04W 88/06* (2013.01); *Y02B 60/50* (2013.01)

(58) Field of Classification Search
CPC ... H04W 4/02; H04W 24/10; H04W 72/0446; H04W 84/12; H04W 88/06; H04W 88/10; H04W 48/10; H04W 36/00; H04W 48/18; H04W 16/14; H04W 24/02; H04W 36/0083; H04W 36/06; H04W 36/30; H04W 36/32
USPC ........................................................ 455/436
See application file for complete search history.

(56) References Cited

U.S. PATENT DOCUMENTS 8,369,853 B1 * 2/2013 Sarkar ............... H04W 36/0083
370/352

FOREIGN PATENT DOCUMENTS

| CN | 102271385 A | 12/2011 |
| EP | 1 463 347 A1 | 9/2004 |
| FR | 2 862 838 A1 | 5/2005 |

OTHER PUBLICATIONS

International Search Report issued in corresponding International application No. PCT/CN2012/074819, date of mailing Feb. 7, 2013.
Written Opinion of the International Searching Authority issued in corresponding International application No. PCT/CN2012/074819, date of mailing Feb. 7, 2013.

* cited by examiner

*Primary Examiner* — Kwasi Karikari
(74) *Attorney, Agent, or Firm* — Patent Portfolio Builders PLLC

(57) ABSTRACT

A cell search for recovering service provided to a mobile communication terminal that has a first communication subsystem capable of accessing a first access network and a second communication subsystem capable of accessing a second access network is performed with reduced power consumption. If the first communication subsystem looses coverage, the cell search is performed using a list of neighboring cells provided by the second communication subsystem and covered by other access network, rather than performing cell search in a full-band searching manner. If the list of cells remains unchanged and the first communication subsystem cannot successfully camp on a cell after a first number of attempts, a time interval for cell search is increased, so as to avoid meaningless search under poor network quality, and thus to reduce the power consumption of the mobile communication terminal.

16 Claims, 5 Drawing Sheets

CELL SEARCH CONTROL METHOD, CELL SEARCH CONTROL APPARATUS, MOBILE COMMUNICATION TERMINAL, COMPUTER PROGRAM AND STORAGE MEDIUM

TECHNICAL FIELD

The embodiments relate to mobile communication technology, in particular to a cell search control method, a cell search control apparatus, a mobile communication terminal, a computer program and a storage medium.

BACKGROUND

With the development of mobile communication technology, new mobile communication access networks have been continuously established and put into use by mobile communication operators, such as 3G access network and LTE access network. At the same time, the existing mobile communication access networks are also reserved by the operators, such as GSM access network. As a result, multiple mobile communication access networks are coexisting.

However, different mobile communication access networks have different advantages. For example, network coverage of GSM access network is broader so as to provide better voice call service to users; the network speed of TD-SCDMA access network or WCDMA access network is faster so as to provide high-speed data service to users; while LTE access network can provide even higher-speed service with low delay so as to provide high-definition sound in real time and high-speed data service to users.

In order to make full use of the advantages of different access networks, there is a trend to integrate a plurality of network access techniques in a same operator network. Therefore, user can use one mobile communication terminal to access different access networks. Moreover, different services can be provided through different access networks.

During the integration of multiple access technologies, a single-(U)SIM dual standby/multiple standby mobile communication terminal is used. It uses one (U)SIM but can access to multiple access networks at the same time, and can supply services of different types by means of the multiple access networks.

In the prior art, when the single-card dual standby/multiple standby mobile communication terminal is in a standby state or is providing the user with services, if the coverage in one of the access networks is lost, a corresponding communication system losing coverage in an access network needs to perform full-band search in the access network, so as to find a cell suitable for camp-on and recover the services.

Because the above-mentioned searching method requires the mobile communication terminal to perform full-band search in the access network in which the coverage is lost, the power consumption of the mobile communication terminal will be increased remarkably.

SUMMARY

The embodiments disclose a cell search control method, a cell search control apparatus, a mobile communication terminal, a computer program and a storage medium, so as to reduce the power consumption of the mobile communication terminal for cell selection after the coverage is lost, and to prolong the standby time of the mobile communication terminal.

In embodiments, a first communication subsystem losing coverage in a first access network performs cell search using a list of neighboring cells provided by a second communication subsystem, rather than performs cell search in a full-band searching manner. As a result, the power consumption of the mobile communication terminal can be reduced when it recovers service from the loss of coverage. When the list of cells remains unchanged and the first communication subsystem cannot successfully camp on a cell after a first number of attempts, a time interval (period) of cell search procedure performed by the first communication subsystem based on the list of cells will be increased, so as to avoid meaningless search under the circumstance of poor network quality, and to reduce the power consumption of the mobile communication terminal.

In embodiments, a threshold of the number of attempts is further provided. When the list of cells remains unchanged and the mobile communication terminal still cannot successfully camp on a suitable cell in the list of cells after the number of attempts by the first communication subsystem reaches the threshold (generally greater than the first number), the first communication subsystem will perform cell search in the first access network in a full-band searching manner. As a result, unrestricted search due to the incorrect list of cells will be avoided.

In embodiments, the cells in the neighboring cells recorded in system information, which belong to the first access network, may further be measured. Cell selection is performed according to the measurement result, and the cells which are obviously unsuitable for camp-on are deleted. Then, the first communication subsystem will perform cell search procedure based on the remaining cells. As a result, the search range of the first communication subsystem losing coverage in the first access network is further narrowed and the power consumption of the mobile communication terminal is reduced.

Of course, embodiments are not limited to the above-mentioned features and advantages. Actually, a person skilled in the art will understand the other features and advantages by reviewing embodiments and drawings hereinafter.

DETAILED DESCRIPTION

Figure 1:
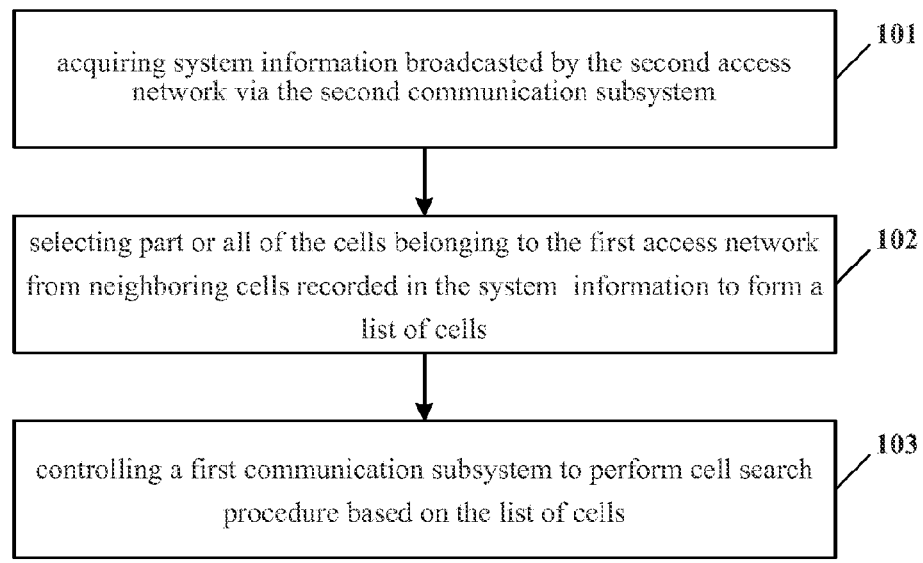
FIG. 1 is a flow chart showing a method for implementing the cell search control according to embodiments.

In a cell search control method, a cell search control apparatus, a mobile communication terminal, a computer program and a storage medium according to embodiments, after the coverage in a first access network is lost, the mobile communication terminal utilizes system information broadcasted in a second access network in which the coverage is not lost to acquire cell information of the first access network, and the mobile communication terminal is controlled to perform cell search in the first access network according to the acquired cell information of the first access network. As a result, after the coverage in one access network is lost, the power consumption of a single-card multiple standby terminal for cell selection will be reduced.

Prior to detailing the method according to embodiments, the mobile communication terminal according to embodiments is described so as to enable a person skilled in the art to understand embodiments in a better manner.

The mobile communication terminal according to embodiments uses a single (U)SIM, and includes a plurality of communication subsystems through which it can access different access networks and provide a user with different services.

The access networks may be any one of the existing access networks such as a GSM/GPRS access network, a TD-SCDMA access network, a LTE access network, a WCDMA access network, a CDMA access network and a WLAN access network.

However, it should be understood that the above access networks can be any possible access network in future, and the types of the access networks will not affect the implementation herein.

In the existing mobile communication terminal, when the coverage in a first access network is lost, services carried in the first access network are migrated to a second access network, and meanwhile the first communication subsystem will perform full-band search in the first access network so as to recover service.

According to embodiments, the second communication subsystem receives system information broadcasted in a corresponding second access network, and acquires a list of cells according to the received system information. Then, the first communication subsystem performs cell search processing according to the cells recorded in the list of cells.

The cell search control method according to embodiments is used for a mobile communication terminal, the mobile communication terminal includes a first communication subsystem capable of accessing a first access network and a second communication subsystem capable of accessing a second access network. The first communication subsystem and the second communication subsystem can provide the user with services simultaneously based on an identical (U)SIM. When the coverage for the mobile communication terminal in the first access network is lost, part or all of the cells that belong to the first access network are selected from neighboring cells recorded in the system information received by the second communication subsystem, to form a list of cells. Then, the first communication subsystem performs cell search procedure based on the list of cells.

As shown in FIG. 1, the cell search control method may comprise:

Step 101: when the coverage in the first access network is lost, acquiring the system information broadcasted by the second access network via the second communication subsystem, wherein the mobile communication terminal currently camps on the cell of the second access network;

Step 102: selecting part or all of the cells belonging to the first access network from the neighboring cells recorded in the system information to form a list of cells; and Step 103: controlling the first communication subsystem to perform cell search procedure based on the list of cells.

When the first communication subsystem still cannot successfully camp on a cell after a first number of times of cell search procedures in a first period based on the list of cells, the first period of cell search procedure performed by the first communication subsystem based on the list of cells may be increased.

In embodiments, the first communication subsystem performs cell search using the neighboring cells provided by the second communication subsystem, rather than in a full-band searching manner. As a result, the search range will be narrowed, and the power consumption for cell search and cell measurement will be reduced when the mobile communication terminal recovers service from the loss of coverage. Meanwhile, when the list of cells remains unchanged and the first communication subsystem cannot successfully camp on one cell in the list of cells after the first times of attempts, it is possible that there is no suitable cell of the first access network in the actual network environment. At this time, the period of cell search procedure performed by the first communication subsystem may be increased (i.e., the time interval between two adjacent cell search procedure will be increased). so as to avoid meaningless search and to reduce the power consumption of the mobile communication terminal.

Of course, considering the situations such as network configuration errors, there exists such a situation where the cells of the first access network recorded in the system information are misconfigurated. Under this situation, if search is performed based on the list of cells, the mobile communication terminal possibly can never successfully camp on one cell in the list of cells. In order to avoid this case, in embodiments, a threshold of the number of times of attempts is provided. When the list of cells remains unchanged and the mobile communication terminal still cannot successfully camp on one cell in the list after the number of attempts reaches the threshold (generally greater than the first number), it means that there may be some errors in the list of cells. At this time, the mobile communication terminal possibly cannot successfully camp on one cell in the list if it continues to perform search using the unchanged list of cells, thus it may perform cell search using the existing scheme of the terminal in case of loss of coverage. In such a mode, the cell search control method further includes: controlling the first communication subsystem to perform cell search in the first access network in a full-band searching manner.

For example, it is presumed that cells A1, A2 and A3 belonging to the first access network are selected from the neighboring cells recorded in the system information to form a list of cells. A1, A2 and A3 may be cell information including an (E)ARFCN ((E-UTRA)Absolute Radio Frequency Channel Number) and a cell identifier, or cell information merely including a (E)ARFCN. This is related to the system information of the second access network and the type of the first access network. Therefore, if A1 includes the cell information including an (E)ARFCN and a cell identifier, A1 is a specific cell, and if A1 merely includes an (E)ARFCN, A1 may be all possible cells at the (E)ARFCN.

At time t1, the first communication subsystem performs cell search procedure based on the list of cells and cannot successfully camp on any one of cells A1, A2 and A3.

At time t1+Δt, the first communication subsystem continues to perform cell search procedure based on the list of cells but still cannot successfully camp on any one of cells A1, A2 and A3.

At time t1+nΔt, the first communication subsystem continues to perform cell search procedure based on the list of cells but still cannot successfully camp on any one of cells A1, A2 and A3.

At this time, when the list of cells remains unchanged and the first communication subsystem still cannot successfully camp on one cell in the list after n+1 times of attempts, it means that the actual network environment of the current first access network may not include the suitable cells in the list. Then, the time interval (period) of cell search procedure performed by the first communication subsystem will be increased from Δt to 2Δt, so as to avoid meaningless search and reduce the power consumption of the mobile communication terminal.

At time t1+nΔt+2Δt, the first communication subsystem continues to perform cell search procedure based on the list of cells but still cannot successfully camp on any one of cells A1, A2 and A3.

At time t1+nΔt+2(2Δt), the first communication subsystem continues to perform cell search procedure based on the list of cells but still cannot successfully camp on any one of cells A1, A2 and A3.

At time t1+nΔt+m(2Δt), the first communication subsystem continues to perform cell search procedure based on the list of cells but still cannot successfully camp on any one of cells A1. A2 and A3.

At this time, the list of cells still remains unchanged, and the first communication subsystem has attempted for n+m+1 times, i.e. it reaches the threshold (n+m+1). The first communication subsystem will perform cell search in the first access network in a full-band searching manner.

Of course, in embodiments, when the first communication subsystem performs cell search in the first access network in a full-band searching manner, if it still cannot successfully camp on a cell after a certain number of full-band searches, the period of full-band search performed by the first communication subsystem may be increased.

It should be understood that, the period of cell search procedure shall not be increased continuously after it is increased to a certain threshold. In other words, the period of search procedure shall have an upper limit, and it will remain unchanged when it is increased to the upper limit. That is a balance between the power consumption and the recover latency.

Of course, the list of cells will be updated when it is changed, and the processing is performed again according to the initialized period and the number of attempts. The procedure is completely the same as that described above and not repeated herein.

Figure 2:
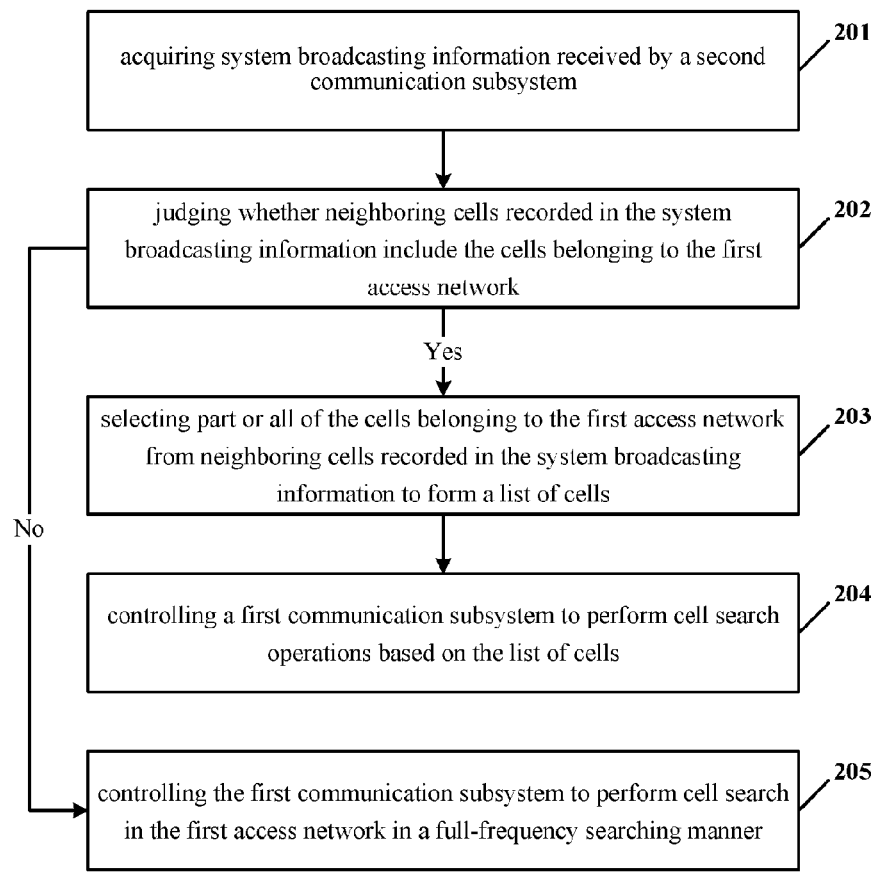
FIG. 2 is a flow chart showing another method for implementing the cell search control according to embodiments.

Because the neighboring cells recorded in the system information may not always include the cells belonging to the first access network, another cell search control method according to embodiments, as shown in FIG. 2, may include:

Step 201: when the coverage in the first access network is lost, the mobile communication terminal will acquire the system information via the second communication subsystem, wherein the mobile communication terminal currently camps on the cells of the second access network;

Step 202: judging whether the neighboring cells recorded in the system information include the cells belonging to the first access network, if yes, turning to Step 203, and otherwise, turning to Step 205;

Step 203: selecting part or all of the cells belonging to the first access network from the neighboring cells recorded in the system information to form a list of cells;

Step 204: controlling the first communication subsystem to perform cell search procedure based on the list of cells; and Step 205: controlling the first communication subsystem to perform cell search procedure in the first access network in a full-band searching manner.

When the first communication subsystem still cannot successfully camp on a cell after a first number of times of cell search procedure repeated every the first period based on the list of cells, the period of cell search procedure performed by the first communication subsystem may be increased.

When the coverage for the mobile communication terminal in the first access network is lost, in order to ensure uninterrupted services and improve user experience, the services provided by the first communication subsystem may be migrated to the second communication system.

Moreover, various mobile communication access networks have different advantages. For example, the GSM/GPRS access network has a more comprehensive network coverage and can provide the user with voice services in a better manner, and the TD-SCDMA access network, WCDMA access network and LTE access network can provide data services in a higher speed and can provide the user with data download services with the requirements for a high speed.

Hence, in the case of the loss of coverage, in order to ensure uninterrupted services, the services carried by the first communication subsystem are migrated to the second communication subsystem. However, once the first communication subsystem performs cell search procedure based on the list of cells and successfully camps on a cell in the list of cells, the services migrated to the second communication subsystem previously shall be migrated back to the first communication subsystem, so as to ensure better user experience.

The method according to embodiments is described hereinafter by taking a GSM/GPRS and TD-SCDMA single-card dual standby terminal as an example. GSM/GPRS is abbreviated to GSM.

Figure 3:
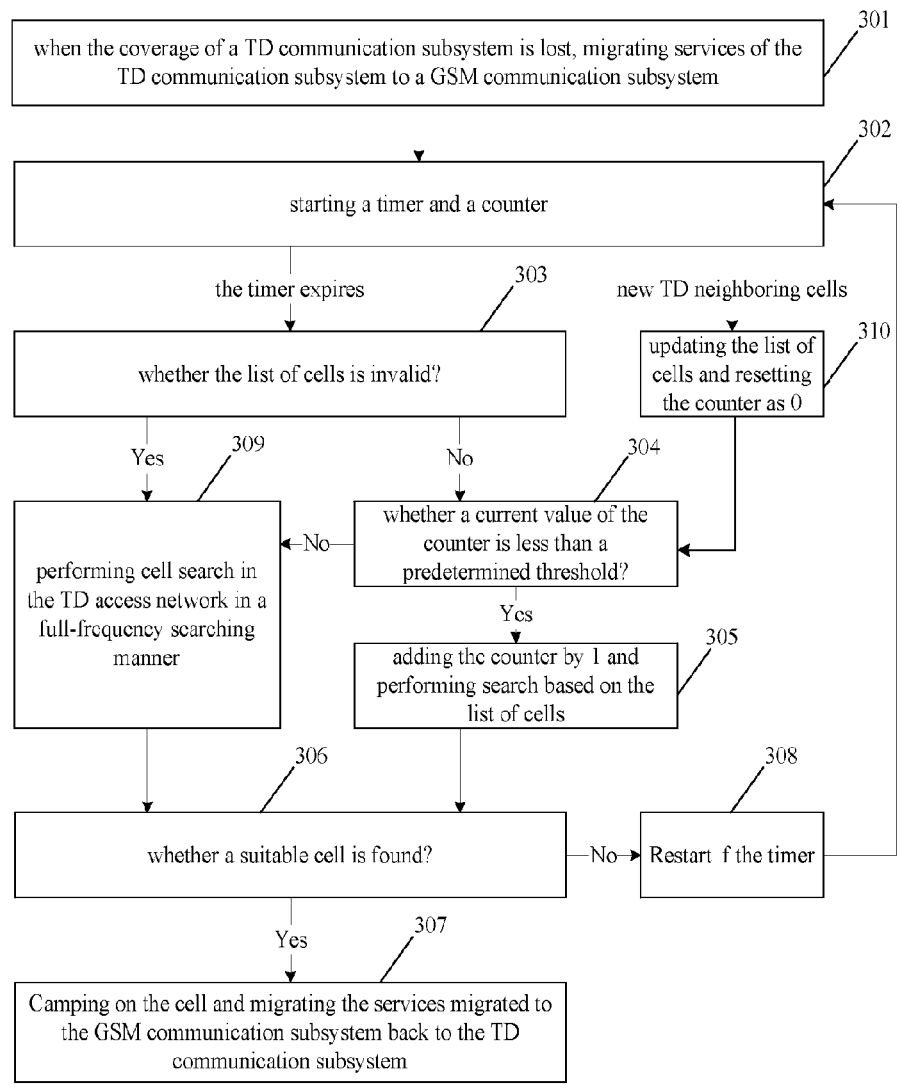
FIG. 3 is a flow chart showing a further detailed method for implementing the cell search control according to embodiments.

FIG. 3 is a flow chart showing a method for implementing the cell search control according to embodiments. The method may include:

Step 301: during the dual standby, after losing the coverage in a TD-SCDMA communication subsystem, i.e., the TD-SCDMA communication subsystem finds that there is no suitable cell meeting a first criterion (which may be a cell selection criterion prescribed in an existing standard, or any other cell selection criterion set by the user or operator specified to a single-card dual standby terminal), the terminal will migrate the services of the TD-SCDM communication subsystem to a GSM communication subsystem in a normal standby state, and register the relevant services on the GSM communication subsystem;

Step 302: starting a timer and a counter which counts from 0, and beginning timing;

After the timing starting, there will appear two branches. One is the processing after the timer expires, and the other is the processing when it is found that the neighboring cells are updated during the timing. These two branches are parallel procedures and are described hereinafter respectively.

As shown in FIG. 3, the processing after the timer expires includes:

Step 303: after the timer expires, judging whether the list of cells is invalid or not, if yes, TD-SCDMA neighboring cells are not recorded in the GSM system information, and turning to Step 309; otherwise turning to Step 304;

Step 304: judging whether the current value of the counter is less than a predetermined threshold of the number of times of attempts, if yes, turning to Step 305; otherwise turning to Step 309;

Step 305: adding the counter by 1, and then performing search according the cells recorded in the list of cells;

Step 306: judging whether a suitable cell has been found, if yes, turning to Step 307; otherwise turning to Step 308;

Step 307: camping on the cell and migrating the services previously migrated to the GSM communication subsystem back to the TD-SCDMA communication subsystem;

Step 308: restart the timer, and entering a new cycle, i.e., turning to Step 302.

When the number of times of attempts in the current timing period does not exceed a threshold, the period of the timer remains unchanged, and when the number of times of attempts exceeds a threshold, the period of the timer may be increased.

Step 309: performing cell search by the TD-SCDMA communication subsystem in the TD-SCDMA access network in a full-band searching manner, and turning to Step 306.

Before the timer expires, if it is found that there exist new cells that belong to the TD-SCDMA access network according to the system information received by the GSM communication subsystem, Step 310 may be performed, i.e., updating the list of cells, resetting the counter as 0, and turning to Step 304.

The above description is given by taking the GSM and TD-SCDMA single-card dual standby terminal as an example. However, the type of the access network of the single-card dual standby terminal is not limited in embodiments.

In embodiments, there are various methods for selecting part or all of the cells belonging to the first access network from the neighboring cells recorded in the system information, so as to form a list of cells. The detailed descriptions are as follows.

First method, selecting all of the cells belonging to the first access network from the neighboring cells recorded in the system information to form the list of cells, so as to provide the first communication subsystem with more choices for search.

However, in the first method, all of the cells belonging to the first access network are recorded in the list of cells, thus the number of searches performed by the first communication subsystem will be still large, and thereby the power consumption may be still more (although it is less comparing with the full-band cell search).

Generally speaking, the terminal will select the cells for camping on to fulfill the selection criterion according to a measurement signal level (such as RSCP level for TDSCDMA, RSRP level for LTE etc). The cell with measurement signal level lower than the threshold will not fulfill the selection criterion and not be selected by the mobile communication terminal.

Based on the above-mentioned description, in embodiments, the measurement signal level of the cells belonging to the first access network may be measured beforehand. Then, the cells whose measurement signal level does not meet some requirements (which can be cell reselection criterion or any other criterion specified for single (U)SIM dual standby terminal) may be removed, and the cells whose signal level meets some requirements are recorded in the list of cells. As a result, the cell search range will be narrowed and the power consumption of the mobile communication terminal for performing cell search will be reduced.

The measurement of the signal level of cells may be completed by the first communication subsystem, or by the second communication subsystem, which are described respectively as follows.

<Measuring the Signal Level of Cells by the Second Communication Subsystem>

In this way, the second communication subsystem itself is in service, thus the second communication subsystem measures the signal level of the cells belonging to the first access network only when the second communication subsystem is in idle time.

In this way, selecting part or all of the cells belonging to the first access network from the neighboring cells recorded in the system information to form a list of cells specifically includes:

measuring the signal level of the cells belonging to the first access network in the neighboring cells in an idle timeslot using a second measurement module arranged in the second communication subsystem; and selecting the cells with the signal level greater than a signal level threshold from the cells belonging to the first access network, to form the list of cells.

Using the measurement module in the second communication subsystem to measure the signal level of the cells in the idle timeslot will not affect the services provided by the second communication subsystem to the user. Meanwhile, since the second communication subsystem performs the measurement of the signal level of the cells, it is unnecessary to awake any module in the first communication subsystem, thereby the power consumption of the terminal will be reduced.

<Measuring the Signal Level of Cells by the First Communication Subsystem>

When the second measurement module arranged in the second communication subsystem is used to measure the signal level of the cells belonging to the first access network, it needs to make certain modification to the measurement module of the second communication subsystem so as to enable it to measure the signal level of the cells belonging to the first access network. This mode is feasible but expensive. Hence, in a second method according to embodiments, it will be more accurate to measure the cells belonging to the first access network by the first communication subsystem.

When the signal level of the cells is measured by the first communication subsystem, selecting part or all of the cells belonging to the first access network from the neighboring cells recorded in the system information to form a list of cells may specifically includes:

awaking a first measurement module in the first communication subsystem to measure the signal level of the cells belonging to the first access network in the neighboring cells by the awoken first measurement module; and selecting the cells with signal level greater than a threshold of signal level from the cells belonging to the first access network to form the list of cells.

In the second method, the module related to the cell measurement in the first communication subsystem is awoken, and the other modules will maintain in an sleep state.

The detailed descriptions on the second method are as follows.

Figure 4:
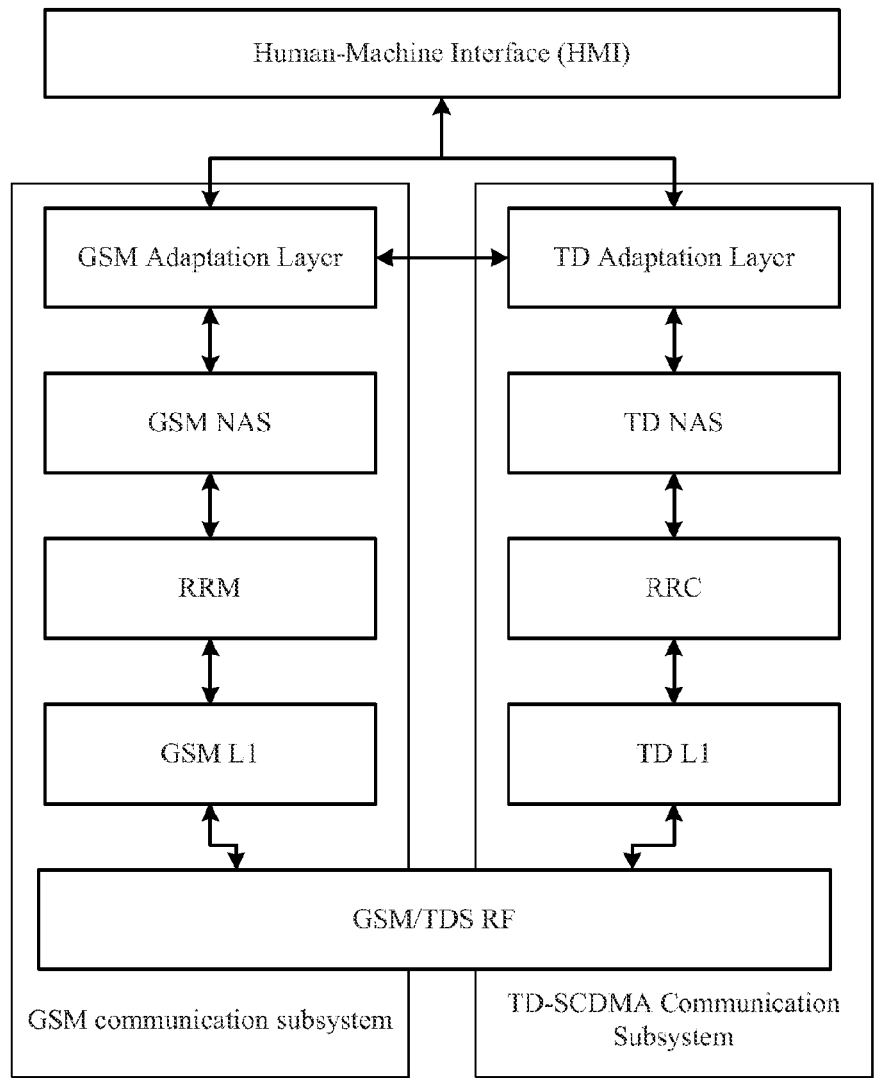
FIG. 4 is a block diagram showing the structure of a single-card dual standby terminal according to embodiments.

As shown in FIG. 4, a GSM and TD-SCDMA single-card dual standby terminal is taken as an example, wherein the first communication subsystem is a TD-SCDMA communication subsystem, and the second communication subsystem is a GSM communication subsystem.

Presumed that the data service (PS) is carried in the TD-SCDMA communication subsystem and the voice service (CS) is carried in the GSM communication subsystem, the single-card dual standby terminal has a structure as shown in FIG. 4. After the single-card dual standby terminal is turned on, the TD-SCDMA and GSM communication subsystems search networks and attempt to camp on normally and respectively.

After the systems camp on normally, the TD-SCDMA communication subsystem performs PS registration in the TD-SCDMA access network, and the GSM communication subsystem performs CS registration in the GSM access network. After successful registration, the terminal enters a dual standby state.

When the coverage for the terminal in the TD-SCDMA access network is lost, the PS service at first carried in the TD-SCDMA communication subsystem is migrated to the GSM communication subsystem.

Then, the GSM communication subsystem will check whether the neighboring cells recorded in the system information include the cells belonging to the TD-SCDMA access network and generate the cell list belonging to the TD-SCDMA access network.

After the cells are determined, as shown in FIG. 4, the terminal will awake a first measurement module arranged in the TD-SCDMA communication subsystem, i.e., physical layer units in FIG. 4 (a TD L1 module and a TD RF module). The TD L1 module and the TD RF module cooperate with each other to complete the measurement of the signal level of the cells and provide the measurement result to the terminal. The terminal performs cell selection according to the measurement result of the signal level and selection criterion (e.g., certain signal level needs to be satisfied within a certain time period, and it may refer to the requirements for inter system measurement and reselection, or a criterion for measurement and reselection with respect to the single-card dual standby terminal).

During the measurement, the modules (including adaptation layer, NAS and RRC) in the first communication subsystem, other than the measurement module, are in an SLEEP state, and as a result, the power consumption may be minimized.

When part of the cells has stronger signal level which will mean to have potential to meet the selection criterion, a narrowed list of cells may be obtained, and at this time, the modules that are in an SLEEP state in the first communication subsystem are turned on so as to perform cell search.

Of course, when none of the cells has stronger signal level which means to have potential to meet the selection criterion, the subsequent cell search procedure will not be triggered. When there exists the cells which has stronger signal level which means to have potential to meet the selection criterion, the first communication subsystem will perform cell search based on the current cells with stronger signal level before they are changed.

Figure 5:
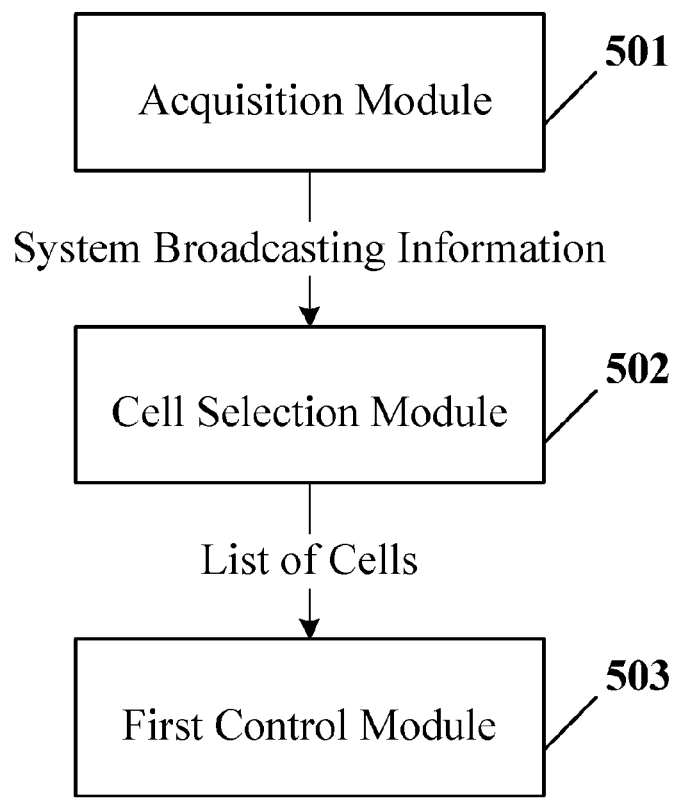
FIG. 5 is a block diagram showing the structure of a cell search control apparatus according to embodiments.

The embodiments further disclose a cell search control apparatus used in a mobile communication terminal. The mobile communication terminal includes a first communication subsystem capable of accessing a first access network and a second communication subsystem capable of accessing a second access network. The first communication subsystem and the second communication system can provide the user with services simultaneously based on an identical (U)SIM. The cell search control apparatus, as shown in FIG. 5, may include:

an acquisition module 501, acquires system information received by the second communication subsystem when the coverage for the mobile communication terminal in the first access network is lost, wherein the mobile communication terminal currently camp on the cell of the second access network;

a cell selection module 502, selects part or all of the cells belonging to the first access network from neighboring cells recorded in the system information of the second access network to form a list of cells; and a first control module 503, controls the first communication subsystem to perform cell search procedure based on the list of cells.

When the first communication subsystem cannot successfully camp on a suitable cell after a first number times of cell search procedure repeated in a first period based on the list of cells (camping on the cell meeting a predetermined requirement, e.g., the cell merely supporting emergency call but not supporting the other services, shall be considered as not successfully camping on a suitable cell), the first control module increases the period of cell search procedure performed by the first communication subsystem based on the list of cells.

When it is unable to camping on a suitable cell for a long time based on the list of cells provided by the second communication subsystem, cell search is performed in a full-band searching manner, so as to find suitable cells for camping on. In this mode, the cell search control apparatus may further include:

a second control module, controls the first communication subsystem to perform cell search in the first access network in a full-band searching manner when the first communication subsystem cannot successfully camping on a suitable cell after a second number of times of cell search procedure based on the list of cells, wherein the second number is greater than the first number.

Of course, when the neighboring cells recorded in the system information do not include the cells belonging to the first access network, cell search is performed directly in a full-band searching manner. Therefore, the cell search control apparatus according to embodiments further includes:

a judgment module, prior to the formation of the list of cells, judges whether the neighboring cells recorded in the system information include the cells belonging to the first access network; and a third control module, when there exist the cells belonging to the first access network, triggers the cell selection module, and otherwise controls the first communication subsystem to perform cell search in the first access network in a full-band searching manner.

According to embodiments, in order to avoid the services from being interrupted, the cell search control apparatus may further include: a migration module, migrates the services corresponding to the first communication subsystem to the second communication subsystem when the coverage for the mobile communication terminal in the first access network is lost.

The migration module is further used to, after the first communication subsystem performs cell search procedure based on the list of cells and successfully camping on the cells in the list of cells, migrates the services previously migrated to the second communication subsystem back to the first communication subsystem, so as to provide better service for the user.

According to embodiments, the signal level of the cells belonging to the first access network is measured beforehand. The cells with the signal level not meeting the requirement are removed, and the cells with the signal level meeting the requirement are recorded in the list of cells, so as to reduce the number of cells to be searched. At this time, the list of cells may be provided in various methods.

In one method, the first communication subsystem measures the signal level of the cells, and at this time the cell selection module includes:

a first measurement control unit, schedules a second measurement module arranged in the second communication subsystem to measure the signal level of the cells belonging to the first access network in the neighboring cells in an idle timeslot; and a first cell selection unit, selects the cells with signal level greater than a signal level threshold from the cells belonging to the first access network to form the list of cells.

In another method, the second communication subsystem measures the signal level of the cells, and at this time, the cell selection module includes:

a second measurement control unit, awakes a first measurement module arranged in the first communication subsystem to measure the signal level of the cells belonging to the first access network in the neighboring cells; and a second cell selection unit, selects the cells with signal level greater than a signal threshold from the cells belonging to the first access network to form the list of cells.

The embodiments further provide a mobile communication terminal. The mobile communication terminal includes a first communication subsystem capable of accessing a first access network and a second communication subsystem capable of accessing a second access network. The first communication subsystem and the second communication subsystem can provide the user with services simultaneously based on one identical (U)SIM. The mobile communication terminal further includes the above-mentioned cell search control means. The cell search control apparatus includes:

an acquisition module, acquires system information received by the second communication subsystem when the coverage for the mobile communication terminal in the first access network is lost, wherein the mobile communication terminal currently camps on the cells of the second access network;

a cell selection module, selects part or all of the cells belonging to the first access network from the neighboring cells recorded in the system information to form a list of cells; and a first control module, controls the first communication subsystem to perform cell search procedure based on the list of cells.

When the first communication subsystem cannot successfully camping on the cells after a first number of times of cell search procedure in a first time interval (period) based on the list of cells, the first control module increases the time interval of cell search procedure performed by the first communication subsystem based on the list of cells.

The method according to embodiments may be implemented in software and/or hardware. Therefore, the cell search control method according to embodiments may be implemented using processing devices such as universal processor, signal processor and so on. The embodiments also provide a computer program including program codes stored in a computer readable medium. The program codes may be loaded and executed by a processor to implement the above methods.

What is claimed is:

1. A cell search control method for a mobile communication terminal including a first communication subsystem capable of accessing a first access network and a second communication subsystem capable of accessing a second access network, the first communication subsystem and the second communication subsystem being able to provide services simultaneously based on one identical (U)SIM, the cell search control method comprising:

acquiring, when a coverage for the mobile communication terminal in the first access network is lost, system information received by the second communication subsystem, wherein the mobile communication terminal is currently camping on a cell of the second access network;

selecting part or all of the cells belonging to the first access network from neighboring cells recorded in the system information to form a list of cells; and controlling the first communication subsystem to perform cell search procedure based on the list of cells, wherein, when the first communication subsystem cannot successfully camp on the cells meeting requirements after a first number of times of cell search procedure in a first time interval (period) based on the list of cells, the first time interval of cell search procedure performed by the first communication subsystem based on the list of cells is increased.

2. The cell search control method according to claim 1, further comprising:

controlling the first communication subsystem to perform cell search in the first access network in a full-band searching manner, when the first communication subsystem cannot successfully camp on the cells meeting the requirement after a second number of times of cell search procedure based on the list of cells, wherein the second number being greater than the first number.

3. The cell search control method according to claim 1, further comprising:

prior to the list of cells being formed, judging whether the neighboring cells recorded in the system information include the cells belonging to the first access network; and when the cells belonging to the first access network are included, selecting the cells to form the list of cells, and otherwise controlling the first communication subsystem to perform cell search in the first access network in a full-band searching manner.

4. The cell search control method according to claim 1, further comprising:

migrating services corresponding to the first communication subsystem to the second communication subsystem when the coverage for the mobile communication terminal in the first access network is lost.

5. The cell search control method according to claim 4, further comprising:

after the first communication subsystem performs cell search procedure based on the list of cells and successfully camps on a suitable cell in the list of cells, migrating the services previously migrated to the second communication subsystem back to the first communication subsystem.

6. The cell search control method according to claim 1, wherein the selecting of part or all of the cells belonging to the first access network from the neighboring cells recorded in the system information to form the list of cells comprises:

scheduling a second measurement module arranged in the second communication subsystem to measure a signal level of each of the cells belonging to the first access network in the neighboring cells in an idle timeslot; and selecting cells with the signal level greater than a signal threshold from the cells belonging to the first access network to form the list of cells.

7. The cell search control method according to claim 1, wherein the selecting of part or all of the cells belonging to the first access network from the neighboring cells recorded in the system information to form the list of cells comprises:

awaking a first measurement module arranged in the first communication subsystem to measure a signal level of each of the cells belonging to the first access network in the neighboring cells; and selecting cells with the signal level greater than a signal threshold from the cells belonging to the first access network to form the list of cells.

8. A cell search control apparatus, used for a mobile communication terminal including a first communication subsystem capable of accessing a first access network and a second communication subsystem capable of accessing a second access network, the first communication subsystem and the second communication subsystem being able to provide a user with services simultaneously based on an identical (U)SIM, the cell search control apparatus comprising:

an acquisition module, configured to acquire system information received by the second communication subsystem, when a coverage for the mobile communication terminal in the first access network is lost, wherein the mobile communication terminal is currently camping on a cell of the second access network;

a cell selection module configured to select part or all of the cells belonging to the first access network from neighboring cells recorded in the system information to form a list of cells; and a first control module, configured to control the first communication subsystem to perform cell search procedure based on the list of cells, wherein, when the first communication subsystem cannot successfully camp on the cells meeting requirements after a first number of times of cell search procedure in a first time interval based on the list of cells, the first control module increases the first time interval of cell search procedure performed by the first communication subsystem based on the list of cells.

9. The cell search control apparatus according to claim 8, further comprising:

a second control module, configured to control the first communication subsystem to perform cell search in the first access network in a full-band searching manner, when the first communication subsystem cannot successfully camp on the cells meeting the requirements after a second number of times of cell search procedure based on the list of cells, wherein the second number is greater than the first number.

10. The cell search control apparatus according to claim 8, further comprising:

a judgment module configured to judge, prior to forming the list of cells, whether the neighboring cells recorded in the system information include the cells belonging to the first access network; and a third control module configured to trigger the cell selection module when the cells belonging to the first access network are included, and otherwise, to control the first communication subsystem to perform cell search in the first access network in a full-band searching manner.

11. The cell search control apparatus according to claim 8, further comprising:

a migration module, configured to migrate services corresponding to the first communication subsystem to the second communication subsystem when the coverage for the mobile communication terminal in the first access network is lost.

12. The cell search control apparatus according to claim 11, wherein the migration module is further configured to migrate the services previously migrated to the second communication subsystem back to the first communication subsystem, after the first communication subsystem performs cell search procedure based on the list of cells and successfully camps on the cells in the list of cells.

13. The cell search control apparatus according to claim 8, wherein the cell selection module comprises:

a first measurement control unit, configured to schedule a second measurement module arranged in the second communication subsystem to measure a signal level of each of the cells belonging to the first access network in the neighboring cells in an idle timeslot; and a first cell selection unit, configured to select cells with the signal level greater than a signal threshold from the cells belonging to the first access network to form the list of cells.

14. The cell search control apparatus according to claim 8, wherein the cell selection module comprises:

a second measurement control unit, configured to awake a first measurement module arranged in the first communication subsystem to measure a signal level of each of the cells belonging to the first access network in the neighboring cells; and a second cell selection unit, configured to select cells with the signal level greater than a signal level threshold from the cells belonging to the first access network to form the list of cells.

15. A mobile communication terminal, comprising:

a first communication subsystem capable of accessing a first access network;

a second communication subsystem capable of accessing a second access network, the first communication subsystem and the second communication subsystem being able to provide a user with services simultaneously based on an identical (U)SIM; and a cell search control apparatus, the cell search control apparatus having:

an acquisition module, configured to acquire system information received by the second communication subsystem, when a coverage for the mobile communication terminal in the first access network is lost, wherein the mobile communication terminal currently camping on a cell of the second access network;

a cell selection module, configured to select part or all of the cells belonging to the first access network from neighboring cells recorded in the system information to form a list of cells; and a first control module, configured to control the first communication subsystem to perform cell search procedure based on the list of cells, wherein, when the first communication subsystem cannot successfully camp on the cells meeting the requirements after a first number of times of cell search procedure in a first time interval based on the list of cells, the first control module increases the first time interval of cell search procedure performed by the first communication subsystem based on the list of cells.

16. A computer-readable storage medium storing executable which when executed by a computer make the computer perform the method according to claim 1.

* * * * *